A. F. RENKEN.
GOPHER TRAP.
APPLICATION FILED FEB. 15, 1912.
1,033,936.
Patented July 30, 1912.
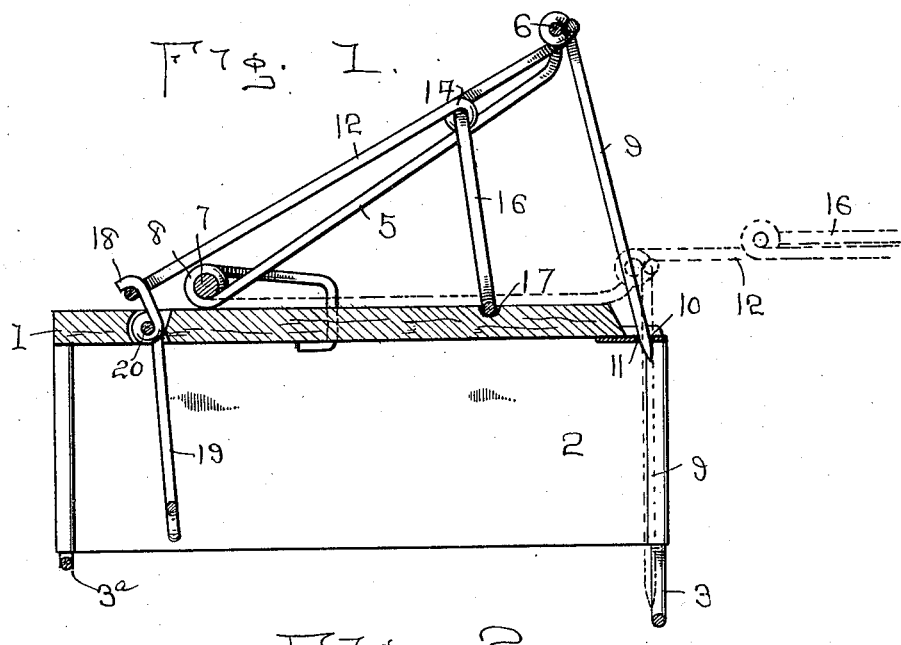
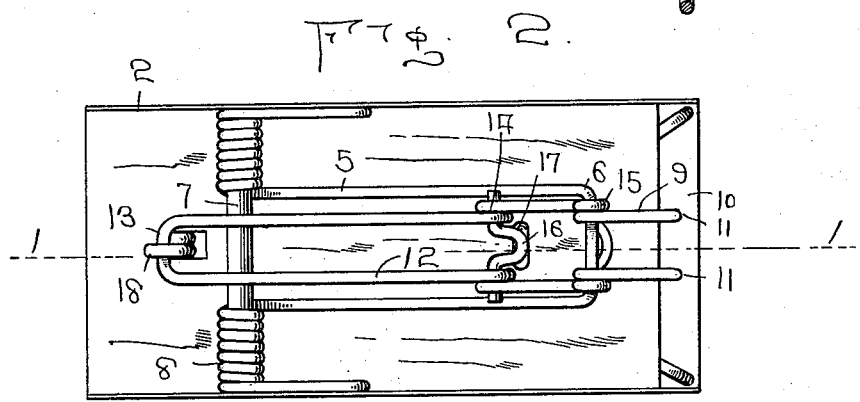
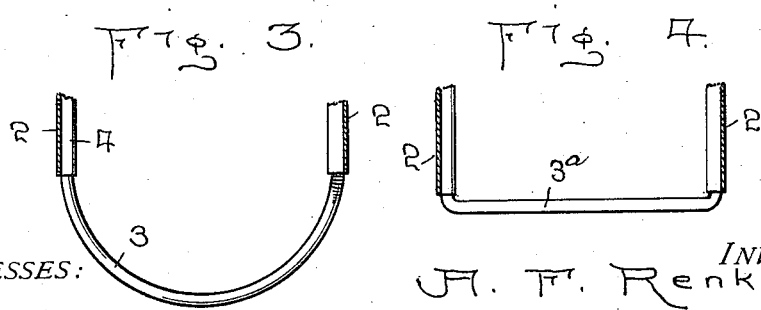
WITNESSES:
Thos. W. Riley
M. Newcomb
INVENTOR
A. F. Renken
BY W. J. Fitzgerald & Co.
Attorneys

UNITED STATES PATENT OFFICE.

ANTON F. RENKEN, OF KRAMER, NEBRASKA.

GOPHER-TRAP.

1,033,936.  Specification of Letters Patent.  Patented July 30, 1912.

Application filed February 15, 1912. Serial No. 677,647.

*To all whom it may concern:*

Be it known that I, ANTON F. RENKEN, a citizen of the United States, residing at Kramer, in the county of Lancaster and State of Nebraska, have invented certain new and useful Improvements in Gopher-Traps; and I do hereby declare the following to be a full, clear, and exact description of the invention, such as will enable others skilled in the art to which it appertains to make and use the same.

My invention relates to new and useful improvements in gopher traps and the object of my invention is to provide a simple, cheap, and efficient trap for catching the rodent known as pocket gopher.

A further object of my invention is to provide means whereby the trap may be easily set without danger to the operator.

Other objects and advantages of my invention will be hereinafter made clearly apparent in the specification and pointed out in the claim.

In the accompanying drawings I have shown the preferred forms which my invention may take.

In said drawings, Figure 1 is a vertical sectional view through my improved form of trap as seen on line 1—1, Fig. 2. Fig. 2 is a top plan view thereon. Fig. 3 is a detail view showing the reinforcing member for the forward end of the trap, and, Fig. 4 is a detail view showing the reinforcing member for the rear end of the trap.

Referring to the drawings in which similar reference numerals designate corresponding parts throughout the several views, 1 is the top of my improved form of trap, which may be formed of wood or any other desired suitable material, to the sides of which are secured downwardly extending plates 2, which form the sides of the trap.

The forward end of the trap is reinforced by means of a substantially U-shaped member 3, which is preferably formed of heavy wire bent into the desired form. The member 3 is secured in place by having a portion of the ends of the sides 2 bent therearound, as shown at 4 in Fig. 3. The rear end of the trap is reinforced by means of a member 3ᵃ as shown in Fig. 4.

The operating member 5 of the trap consists of a spring formed of wire which is bent into a loop, as shown at 6, said loop extending a greater portion of the length of the trap. The free ends of the wire 5 are bent around a core or spool 7 to form the helical springs 8 and the ends of the wire are then directed through openings formed in the top 1 and clenched against the under surface thereof. The construction of the operating springs is clearly shown in Figs. 1 and 2. When the trap is sprung, the loop 6 is directly over the free end of the trap, as clearly shown in dotted lines in Fig. 1.

In order that an animal when endeavoring to pass through the trap may be killed, I secure to the loop 6 a double pronged spear 9. The spear 9 is preferably formed of wire, the ends of which are pointed. The wire forming the spear 9 is bent at its middle to form a loop and the loop is then twisted around the portion of the wire forming the loop 6, as clearly shown in Fig. 1.

In order that the spear 9 may be guided, I preferably secure to the under surface of the top 1 a plate 10, which is provided with apertures 11, through which the spear 9 extends. In order that the operating member 5 may be easily raised when it is desired to set the trap, I provide a double lever arm 12, which is also preferably formed of wire. Said lever arm 12 is formed of a single piece of wire bent upon itself, as shown at 13, each section of the wire given a turn, as shown at 14, and the extreme ends of the wire given a turn, as shown at 15, around the loop 6. The fulcrum for the double lever arm is formed from a single piece of wire 16, which is substantially U-shaped, the ends of said wire 16 being bent into alinement and extended through the turns 14, as clearly shown in Fig. 2.

When it is desired to set the trap the end of the U-shaped member 16 is positioned in a recess 17 formed in the upper surface of the top of the trap and pressure is brought to bear upon the looped end 13 of the double lever arm 12. This results in elevating the looped end 6 of the operating member into the position shown in Fig. 1. When in this position the looped end 13 is adapted to be engaged by the latch 18 of a trigger 19 which is pivotally secured in the top of the trap. The latch and trigger are preferably formed of a single piece of wire, bent at right angles to form the latch, given a turn for the pivot pin 20 and then extended downwardly into the path of an animal.

When it is desired to place the trap in service the same is set as hereinbefore described and the trap placed in the runway of the animals which it is desired to catch. The animal when endeavoring to pass through the forward end of the trap will engage the trigger 19 and disengage the latch 18 from the looped end of the double lever arm 12. The operating spring 5 will immediately return to the position shown in dotted lines in Fig. 1 and the prongs of the spear 9 will be driven through the animal.

From the foregoing description it will be seen that I have provided a trap, all the operating parts of which are formed from wire. By this construction a very cheap trap is secured.

While I have shown the preferred form which my invention may take, I desire it to be understood that I may make certain modifications therein without departing from the spirit and scope of my invention.

What I claim as new is:—

In a trap the combination with a top and sides; of a spear vertically movable in the forward end of said trap, a spring adapted to operate said spear, a retracting lever secured to said spring, a loop pivotally secured to said lever between its ends and adapted to be positioned against the top of said trap to form the fulcrum for said lever, and a combined latch and trigger for normally engaging said lever to hold said spear in its upper position.

In testimony whereof I have signed my name to this specification in the presence of two subscribing witnesses.

ANTON F. RENKEN.

Witnesses:
  JOSEPH KLEIN,
  LOUIS HELMER.

Copies of this patent may be obtained for five cents each, by addressing the "Commissioner of Patents, Washington, D. C."